US012411725B2

(12) United States Patent
Moon et al.

(10) Patent No.: US 12,411,725 B2
(45) Date of Patent: Sep. 9, 2025

(54) SYSTEM BASED ON IOMT AND OPERATING METHOD OF THE SAME

(71) Applicant: Korea Electronics Technology Institute, Seongnam-si (KR)

(72) Inventors: JaeWon Moon, Seoul (KR); Seung Woo Kum, Yongin-si (KR); Seungtaek Oh, Seoul (KR); Sung Joo Park, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 18/466,210

(22) Filed: Sep. 13, 2023

(65) Prior Publication Data

US 2024/0111621 A1   Apr. 4, 2024

(30) Foreign Application Priority Data

Sep. 30, 2022 (KR) .................. 10-2022-0124817
Sep. 30, 2022 (KR) .................. 10-2022-0124818

(51) Int. Cl.
*G06F 11/00*  (2006.01)
*G06F 11/07*  (2006.01)

(52) U.S. Cl.
CPC ........ *G06F 11/079* (2013.01); *G06F 11/0709* (2013.01)

(58) Field of Classification Search
CPC .................. G06F 11/079; G06F 11/0709
See application file for complete search history.

(56) References Cited

U.S. PATENT DOCUMENTS

| 10,579,460 | B2* | 3/2020 | Kim ................. H04L 67/55 |
| 11,144,382 | B2* | 10/2021 | Justin .............. G06F 11/0787 |
| 11,221,905 | B2* | 1/2022 | Venkatesan ........ G06F 11/3006 |

(Continued)

FOREIGN PATENT DOCUMENTS

| KR | 2017-0064349 A | 6/2017 |
| KR | 2019-0023544 A | 3/2019 |

(Continued)

OTHER PUBLICATIONS

Extended European Search Report received in EP Application No. 23186268.1 dated Apr. 19, 2024.

(Continued)

*Primary Examiner* — Jonathan D Gibson
(74) *Attorney, Agent, or Firm* — Knobbe, Martens, Olson & Bear, LLP

(57) ABSTRACT

Proposed is a system based on the Internet of Media Things (IoMT). The system may include at least one first sensor configured to perform a predetermined function in a target space or region, and a second sensor based on at least one of video or audio. The system may also include a first analysis processor configured to generate first analysis data of a set mission within the target space or region based on first data sensed by the first sensor. The system may further include a second analysis processor configured to generate second analysis data for a set mission within the target space or region based on second data sensed by the second sensor. The system may further include storage configured to store the sensed first data and second data and the first and second analysis data based on the identifier.

15 Claims, 18 Drawing Sheets

(56) References Cited

U.S. PATENT DOCUMENTS

| | | | |
|---|---|---|---|
| 12,141,620 B2* | 11/2024 | Bartfai-Walcott | H04L 67/10 |
| 2009/0109061 A1 | 4/2009 | McNew et al. | |
| 2014/0376771 A1* | 12/2014 | Moon | G06V 20/188 |
| | | | 382/103 |
| 2018/0150344 A1* | 5/2018 | Kim | G06F 11/079 |
| 2019/0001993 A1 | 1/2019 | Visintainer et al. | |
| 2020/0183774 A1* | 6/2020 | Justin | G06F 11/0751 |
| 2020/0272159 A1 | 8/2020 | Zhang et al. | |
| 2020/0320869 A1 | 10/2020 | Malhan et al. | |
| 2020/0358800 A1* | 11/2020 | Bisht | H04L 63/1425 |
| 2021/0076454 A1* | 3/2021 | Palanivel | G06V 20/46 |
| 2022/0300363 A1* | 9/2022 | Barat | G06F 11/079 |
| 2024/0111621 A1* | 4/2024 | Moon | G06F 11/079 |

FOREIGN PATENT DOCUMENTS

| | | |
|---|---|---|
| KR | 10-2019-0140658 A | 12/2019 |
| KR | 10-2020-0029459 A | 3/2020 |
| KR | 10-2154776 B1 | 9/2020 |
| KR | 10-2021-0028966 A | 3/2021 |
| KR | 10 2300799 B | 9/2021 |
| KR | 10-2022-0011878 A | 2/2022 |
| KR | 10-2022-0108480 A | 8/2022 |

OTHER PUBLICATIONS

Office Action dated Sep. 23, 2024 in Korean Application No. 10-2022-0124817, in 6 pages.
Office Action dated Nov. 13, 2023 in KR Patent Application No. 10-2022-0124818.
Office Action received in corresponding Korean Patent Application No. 10-2022-0124817 dated Jun. 9, 2025.

* cited by examiner

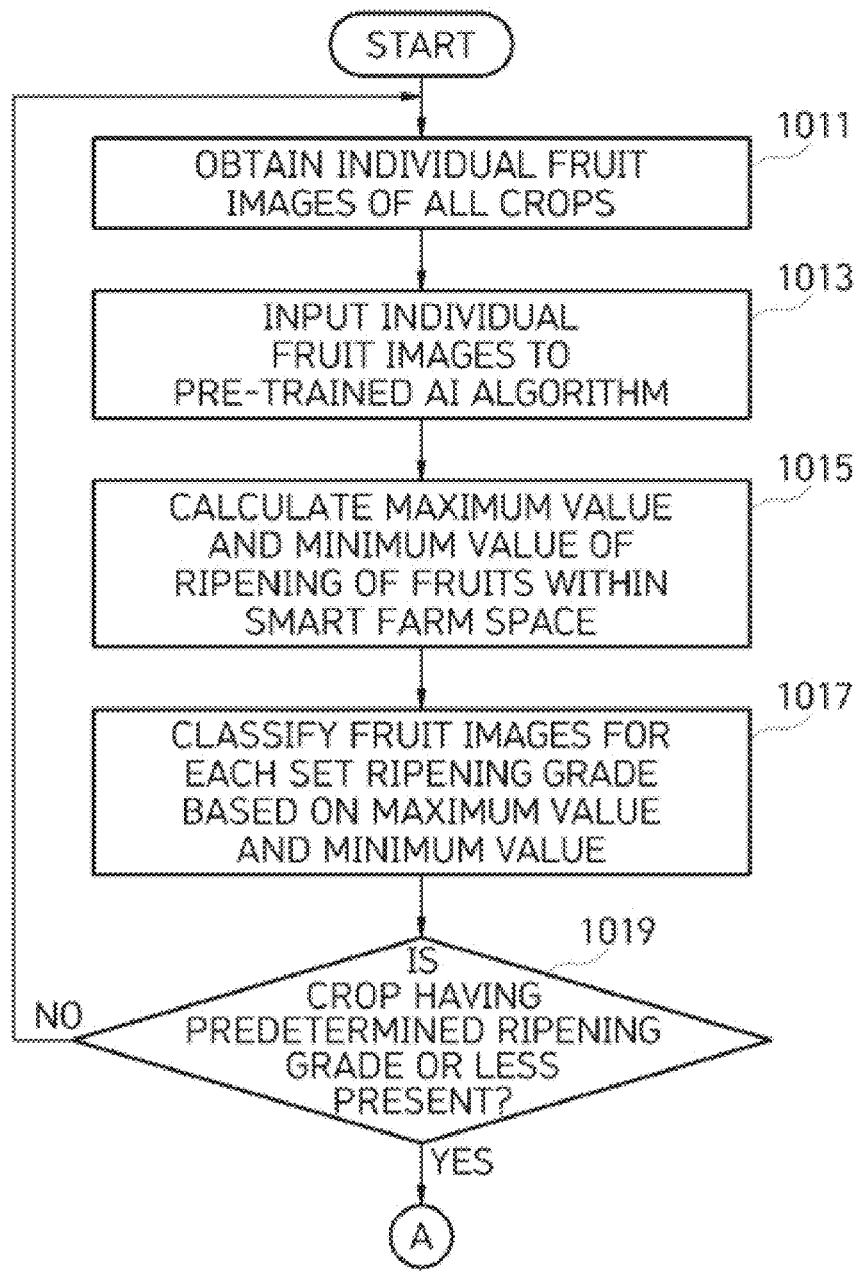

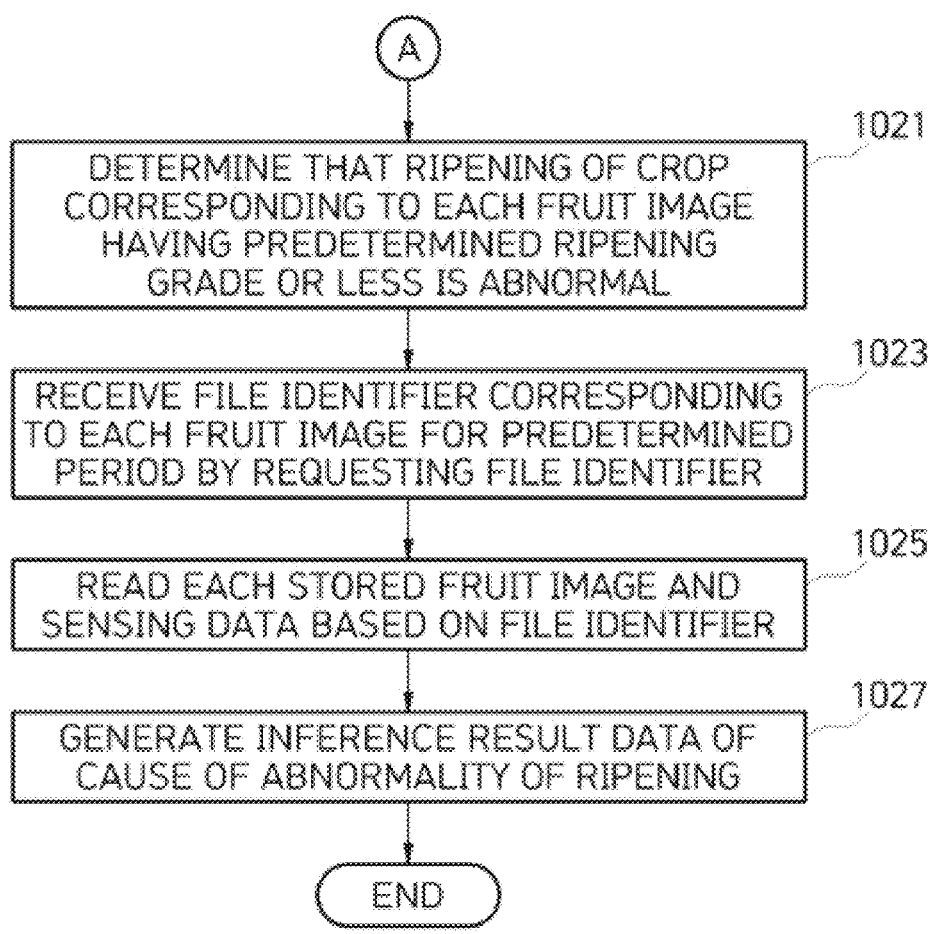

SYSTEM BASED ON IOMT AND OPERATING METHOD OF THE SAME

CROSS-REFERENCE TO RELATED APPLICATIONS

This application claims priority to and the benefit of Korean Patent Application No. 10-2022-0124817, filed on Sep. 30, 2022 and Korean Patent Application No. 10-2022-0124818, filed on Sep. 30, 2022, the disclosure of each of which is incorporated herein by reference in its entirety.

BACKGROUND

Technical Field

The present disclosure relates to a system based on the Internet of Media Things (IoMT) and an operating method of the same.

Description of the Related Technology

The Internet of Things (IoT) means the Internet over which things have been interconnected or the Internet consisting of things.

SUMMARY

One aspect is a system based on the IoMT and an operating method of the same, wherein a mission set in each target spaces/region is performed through a first sensor unit that performs a predetermined function in the target space/area and a second sensor unit based on video and audio, whether abnormality is present in each target space/region is analyzed based on each of sensed data, and the inference result data of the cause of the abnormality is generated.

Another aspect is a system based on the Internet of Media Things (IoMT) that includes at least one first sensor unit configured to perform a predetermined function in a target space or region, a second sensor unit based on at least one of video and audio, a first analysis unit configured to generate first analysis data of a set mission within the target space or region based on first data sensed by the first sensor unit, a second analysis unit configured to generate second analysis data for a set mission within the target space or region based on second data sensed by the second sensor unit, and storage configured to store the sensed first data and second data and the first and second analysis data based on the identifier.

Another aspect is a system for managing a smart farm based on the Internet of Media Things (IoMT) that includes at least one first sensor unit configured to perform a predetermined function in a smart farm space, a second sensor unit configured to obtain image data obtained by photographing the smart farm space, a first analysis unit configured to analyze inference result data of the cause of abnormality of a crop within the smart farm space based on sensing data of the first sensor unit, a second analysis unit configured to monitor an abnormal state of the crop within the smart farm space based on the image data of the second sensor unit, and storage configured to store the sensing data of the first sensor unit and the image data of the second sensor unit based on a file identifier.

Another aspect is an operating method that is performed by a system based on the Internet of Media Things (IoMT) that includes generating first analysis data for a set mission within a target space or region based on first data sensed by a first sensor unit, generating second analysis data for a set mission within the target space or region based on second data sensed by a second sensor unit, and storing the sensed first data and second data and the first and second analysis data based on an identifier. In this case, the first sensor unit includes at least one sensor that performs a predetermined function in the target space or region, and the second sensor unit includes a sensor based on at least one of video and audio.

In addition, another method and another system for implementing the embodiments of the present disclosure and a computer-readable recording medium on which a computer program for executing the method may be further provided.

The embodiments of the present disclosure have advantages in that whether abnormality is present in a target space or region can be detected based on the IoMT and rapid measures can be taken against the cause of the abnormality in a target space or region by generating the inference result data of the cause of the abnormality through individual analysis or associated analysis of stored data.

Furthermore, the embodiments of the present disclosure have advantages in that in growing and cultivating crops, various abnormal states of crops can be monitored in real time by using a plurality of analysis units that perform functions different from the function of a sensor unit based on the IoMT and rapid measures can be taken against various abnormal states by generating the inference results of the abnormal state for each case through the storage and management of data.

Effects of the present disclosure which may be obtained in the present disclosure are not limited to the aforementioned effects, and other effects not described above may be evidently understood by a person having ordinary knowledge in the art to which the present disclosure pertains from the following description.

BRIEF DESCRIPTION OF THE DRAWINGS

FIGS. 10A and 10B are diagrams for describing a method of managing a smart farm according to a first embodiment of the present disclosure.

DETAILED DESCRIPTION

Figure 1:
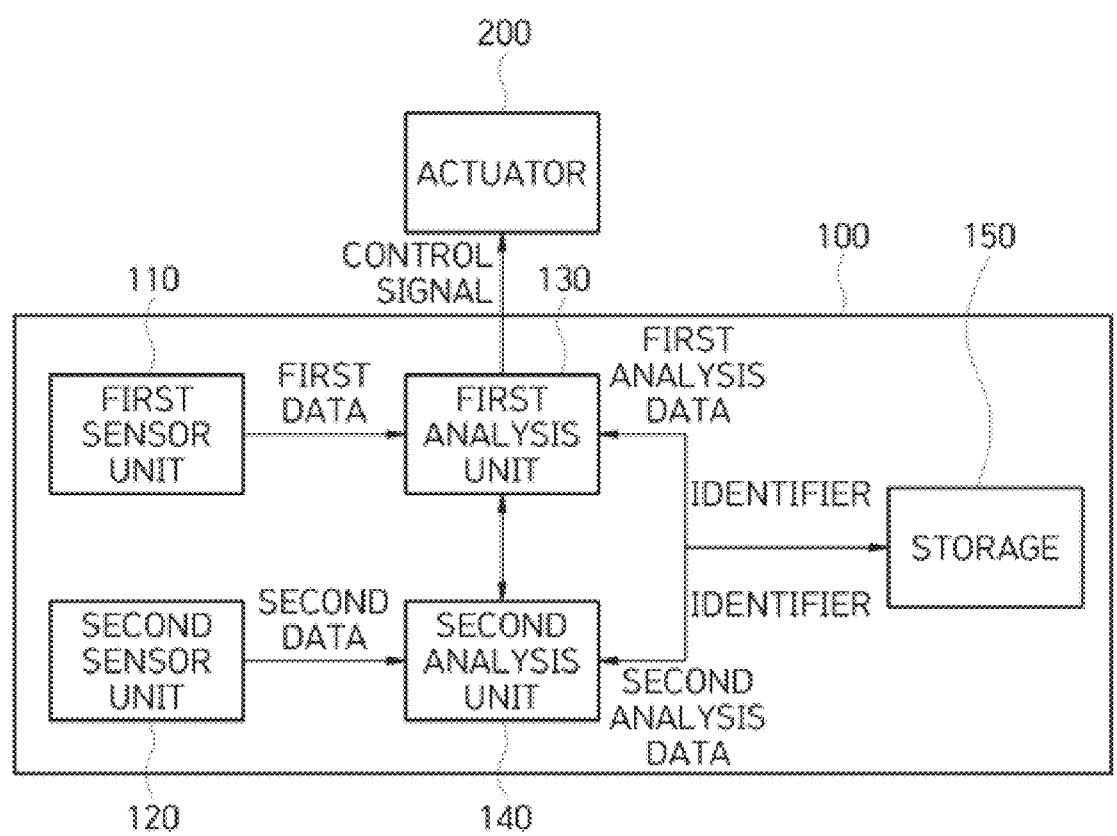
FIG. 1 is a block diagram of a system based on the IoMT according to an embodiment of the present disclosure.

Recently, media-based data, such as audio and video, are widely exchanged on the Internet. In providing IoT services, media such as audio and video tend to be merged and applied.

In relation to the IoMT, in the Moving Picture Experts Group (MPEG) that is a standardization organization, the IoMT is being standardized through the MPEG-Internet of Media Things (IoMT); ISO/IEC JTC1 23093 project in order to correspond to the development of the IoT.

Advantages and characteristics of the present disclosure and a method for achieving the advantages and characteristics will become apparent from the embodiments described in detail later in conjunction with the accompanying drawings. However, the present disclosure is not limited to the disclosed embodiments, but may be implemented in various different forms. The embodiments are merely provided to complete the present disclosure and to fully notify a person having ordinary knowledge in the art to which the present disclosure pertains of the category of the present disclosure. The present disclosure is merely defined by the claims.

Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other elements in addition to a mentioned element. Throughout the specification, the same reference numerals denote the same elements. "And/or" includes each of mentioned elements and all combinations of one or more of mentioned elements. Although the terms "first", "second", etc. are used to describe various components, these elements are not limited by these terms. These terms are merely used to distinguish between one element and another element. Accordingly, a first element mentioned hereinafter may be a second element within the technical spirit of the present disclosure.

All terms (including technical and scientific terms) used in this specification, unless defined otherwise, will be used as meanings which may be understood in common by a person having ordinary knowledge in the art to which the present disclosure pertains. Furthermore, terms defined in commonly used dictionaries are not construed as being ideal or excessively formal unless specially defined otherwise.

Prior to description of the present disclosure, terms written in the present disclosure may be understood as follows.

Media: data which may be rendered, including audio, video, text, graphics, images, haptic, and haptic information A media thing (Mthing): the Mthing means a thing which can detect, collect, drive, or process media or metadata.

The Internet of Mthing (IoMT): the IoMT means a special lower group of the IoT a major function of which is related to the process of media.

An IoMT device: the IoMT device means an IoT device having two or more Mthings.

A system and method based on the IoMT according to an embodiment of the present disclosure is applied to a smart farm. That is, the present disclosure is focused on the monitoring and management of the state of crops through sensors that perform various functions and an analysis function in a smart farm space by applying the system and method based on the IoMT according to an embodiment to a smart farm.

In the description of the present disclosure, a system and method based on the IoMT described with reference to FIGS. 1 to 6 are first described in detail. A structure in which the system and method have been applied to a smart farm environment is described in detail with reference to FIGS. 7 to 14A and 14B. Constructions described with reference to FIGS. 1 to 6 are applied to the embodiment in which the system and method have been applied to the smart farm environment without any change. In the description of FIGS. 7 to 14A and 14B, contents redundant with the contents described with reference to FIGS. 1 to 6 are omitted.

FIG. 1 is a block diagram of a system 100 based on the IoMT according to an embodiment of the present disclosure.

The system 100 (also called an IoMT device) according to an embodiment of the present disclosure is an Mthing, and includes a first sensor unit (or a first sensor) 110, a second sensor unit (or a second sensor) 120, a first analysis unit (or a first analysis processor) 130, a second analysis unit (or a second analysis processor) 140, and storage 150.

The first sensor unit 110 includes at least one sensor that performs a predetermined function in a target space or region. As an embodiment, the target space means a three-dimensional space, and the target region means a two-dimensional space. The first sensor unit 110 may include a temperature sensor, a humidity sensor, and an illuminance sensor, for example. The first sensor unit 110 is used to collect environment information.

The second sensor unit 120 includes a sensor that generates sensing data based on at least one of video and audio in a target space or region. The second sensor unit 120 is used to collect video and audio from a management target. The second sensor unit 120 may include a camera and a microphone, for example.

The first analysis unit 130 generates first analysis data of a set mission within a target space or region based on first data sensed by the first sensor unit 110.

The second analysis unit 140 generates second analysis data for a set mission within the target space or region based on second data sensed by the second sensor unit 120.

The storage 150 stores and manages the sensed first and second data and the first and second analysis data based on an identifier.

Figure 2:
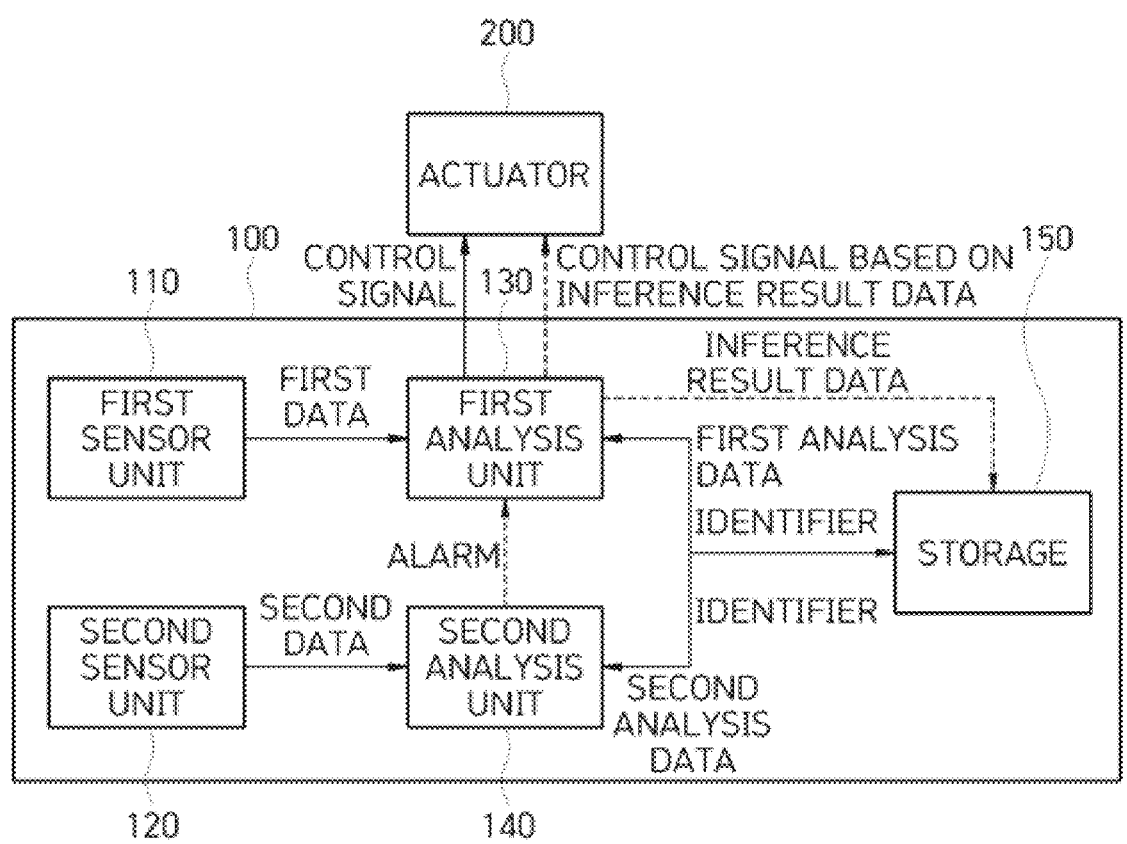
FIG. 2 is a diagram for describing a process of detecting abnormality in the system based on the IoMT according to an embodiment of the present disclosure.

FIG. 2 is a diagram for describing a process of detecting abnormality in the system 100 based on the IoMT according to an embodiment of the present disclosure.

As an embodiment, the first analysis unit 130 may analyze an abnormal situation based on first data, that is, environment information collected by the first sensor unit 110. That is, a set mission of the first analysis unit 130 is to detect whether abnormality is present in a target space or region, and may analyze whether abnormality is present in the target space or region based on the first data and generate the results of the detection as first analysis data.

According to an embodiment, the first analysis unit 130 may not detect whether abnormality is present in a target space or region. The second analysis unit 140 may detect whether abnormality is present in the target space or region based on second data, and may transmit the results of the detection to the first analysis unit 130. On the contrary to this, the second analysis unit 140 may not detect whether abnormality is present in the target space or region. The first analysis unit 130 may detect whether abnormality is present in the target space or region based on the first data, and may transmit the results of the detection to the second analysis unit 140.

Based on such a construction, in an embodiment of the present disclosure, when detecting whether abnormality is present in the target space or region based on the first data, the first analysis unit 130 receives an identifier corresponding to the second data for a specific period by requesting the identifier from the second analysis unit 140. Furthermore, the first analysis unit 130 reads the second data that have been stored in the storage 150 by requesting the second data from the second analysis unit 140 based on the identifier. Accordingly, the first analysis unit 130 may generate the inference result data of the cause of the abnormality corresponding to a detected abnormal state.

Furthermore, the first analysis unit 130 may generate a control signal for driving an actuator 200 installed in the target space or region, based on the first data and the inference result data.

In an embodiment of the present disclosure, the first analysis unit 130 may package the first data in a predetermined time unit, and may store the packaged first data in the storage 150 based on an identifier. Accordingly, the first analysis unit 130 may generate the inference result data of the cause of the abnormality on the basis of a predetermined time unit.

Figure 3:
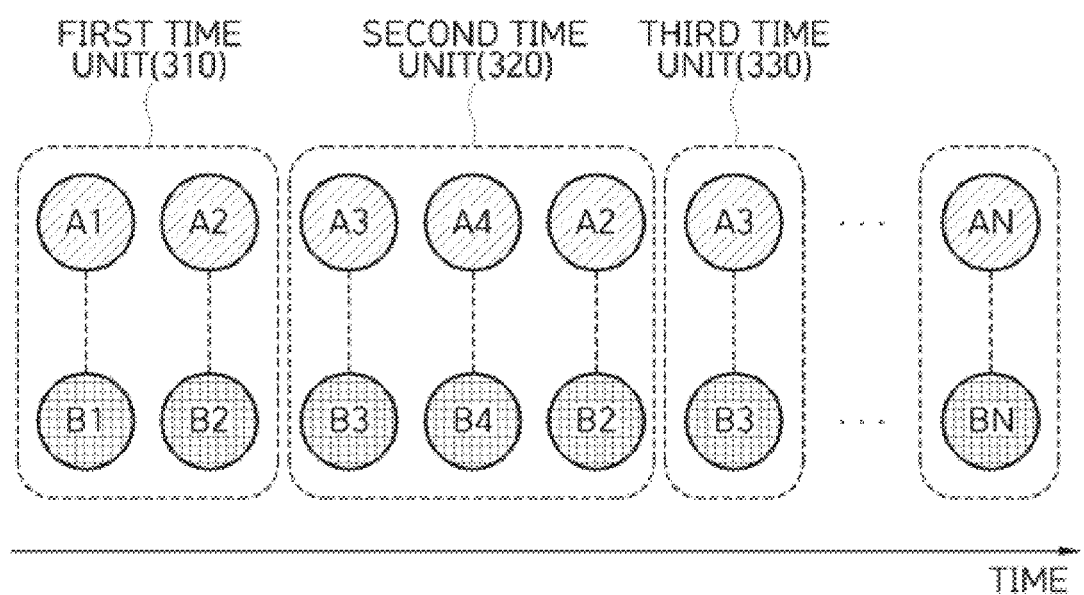
FIG. 3 is a diagram illustrating an example in which first and second data have been packaged in an embodiment of the present disclosure.

FIG. 3 is a diagram illustrating an example in which first and second data have been packaged in an embodiment of the present disclosure.

As another embodiment, the first analysis unit 130 and the second analysis unit 140 may package first and second data, respectively, in predetermined time units 310 to 330. The first and second data that have been packaged as described above are mutually matched to correspond to the time units 310 to 330, and are stored in the storage 150. As described above, to mutually match the first and second data based on the time units 310 to 330 and store the first and second data in the storage 150 is for generating the inference result data of the cause of the abnormality based on association information associated with the first and second data.

In this case, FIG. 3 has illustrated an example in which the first and second data collected each have been packaged in different first to third time units 310 to 330. Such a time unit for packaging may be the same time unit with respect to all of the first and second data or may be the same or different time unit with respect to all of the first and second data. The time unit for packaging may be determined based on characteristics of collected data.

Figure 4:
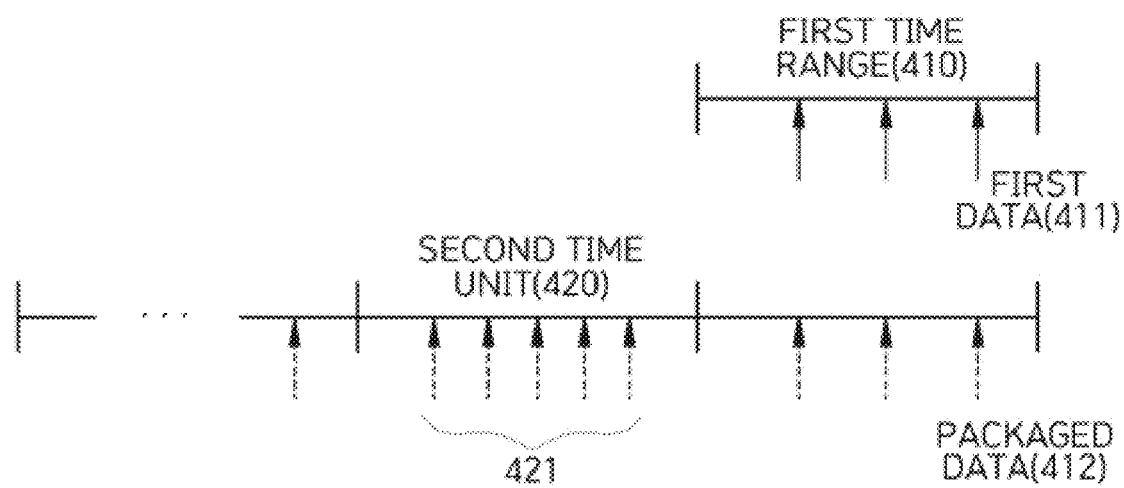
FIG. 4 is a diagram for describing contents in which the inference result data of the cause of the abnormality are generated based on association information in an embodiment of the present disclosure.

FIG. 4 is a diagram for describing contents in which inference result data of the cause of the abnormality are generated based on association information in an embodiment of the present disclosure.

As a detailed embodiment, when detecting whether abnormality is present in a target space or region based on first data 411 corresponding to a first time range 410, the first analysis unit 130 receives packaged first and second data 412 corresponding to the first time range 410 by requesting an identifier corresponding to the packaged first and second data 412 from the second analysis unit 140.

Thereafter, the first analysis unit 130 receives packaged first and second data 421 that include the first time range 410 of the packaged first and second data 412 and that correspond to a second time range 420 expanded to be greater than the first time range 410. In this case, the second time range 420 may be determined to be plural times the first time range 410 or may be determined in advance.

For example, when the first time range 410 is set to 1 minute, the first analysis unit 130 detects whether abnormality is present in the target space or region based on the first data 411 for the 1 minute in the past on the basis of current timing. Furthermore, when detecting whether abnormality is present in the target space or region, the first analysis unit 130 receives the packaged first and second data 412 for the current timing by requesting an identifier corresponding to the packaged first and second data 412 from the second analysis unit 140.

Furthermore, the first analysis unit 130 receives the packaged first and second data 421 that include the first time range 410 from the current timing and that correspond to the second time range 420 (e.g., 10 minutes) extended from the first time range 410 by requesting the packaged first and second data 421 from the second analysis unit 140.

Accordingly, the first analysis unit 130 may generate the inference result data of the cause of the abnormality based on association information on which the first and second data 412 and 421 corresponding to the first and second time ranges 410 and 420, respectively, have been associated. Such association information is used to analyze the cause of abnormality more accurately along with a degree of change in the ideal value of the first time range 410 and the ideal value of the second time range 420. This is for inferring the cause of the abnormality more accurately by expanding the first time range 410 to the second time range 420 because the cause of the abnormality may not be analyzed if only the first time range 410 is used.

In contrast, as another detailed embodiment, when detecting whether abnormality is present in the target space or region based on the first data corresponding to the first time range, the first analysis unit 130 may read, from the storage 150, the first data that include the first time range of the first data and that correspond to the second time range expanded to be greater than the first time range, and may generate the inference result data of the cause of the abnormality based on the first data corresponding to the first and second time ranges.

As still another detailed embodiment, when detecting whether abnormality is present in the target space or region based on the first data corresponding to the first time range, the first analysis unit 130 may read, from the storage 150, the second data that include the first time range of the first data and that correspond to the second time range expanded to be greater than the first time range by requesting an identifier corresponding to the second data from the second analysis unit 140, and may generate the inference result data of the cause of the abnormality based on the first data corresponding to the first time range and the second data corresponding to the second time range.

Figure 5:
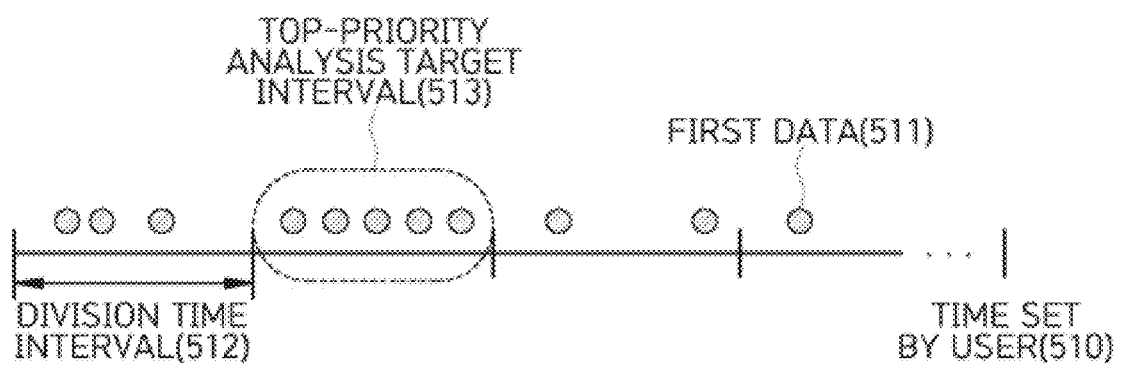
FIG. 5 is a diagram for describing contents in which inference analysis result data are generated by setting a top-priority analysis target interval in an embodiment of the present disclosure.

FIG. 5 is a diagram for describing contents in which inference analysis result data are generated by setting a top-priority analysis target interval in an embodiment of the present disclosure.

In an embodiment of the present disclosure, the first analysis unit 130 may sum and calculate the time corresponding to first data 511 detected to be abnormal in a time range 510 that has been set by a user. Thereafter, the first analysis unit 130 may generate a division time interval 512 by dividing the set time range 510 by the summed and calculated time, and may set a corresponding division time interval as a top-priority analysis target interval 513 for generating inference analysis result data of the cause of the abnormality when the number of first data 511 detected to be abnormal in each division time interval 512 is a minimum detection number or more or when the number of first data 511 detected to be abnormal in all of the division time intervals is an average detection number or more.

In this case, if the number of division time intervals 512 that satisfies the minimum detection number or more or the average detection number or more is plural, a division time interval 512 having a larger number of first data 511 detected, among the division time intervals 512, may be preferentially analyzed.

For example, when the time range 510 set by a user is 24 hours, the first analysis unit 130 sums and calculates the time corresponding to the first data 511 detected to be abnormal for the 24 hours. In this case, the time corresponding to the first data 511 may be the first time range (e.g., 1 minute) or may be variably set.

Thereafter, when the time that has been summed and calculated for the 24 hours is 60 minutes, the first analysis unit 130 generates twenty-four division time intervals 512 by dividing the 24 hours set by the user by the 60 minutes, that is, the summed and calculated time.

Thereafter, the first analysis unit 130 may set a division time interval 512 in which the number of first data 511 detected to be abnormal is a minimum detection number (e.g., 4) or more, among the twenty-four division time intervals 512, as the top-priority analysis target interval 513 for generating inference analysis result data of the cause of the abnormality. Alternatively, the first analysis unit 130 may set a division time interval 512 in which the number of first data 511 detected to be abnormal is an average detection number (e.g., 2.5), among the twenty-four division time intervals 512, as the top-priority analysis target interval 513.

As described above, in an embodiment of the present disclosure, whether abnormality is present in a target space or region is continuously detected, but a specific interval range may be set by averaging data and the cause of abnormality in a specific interval range having the most abnormality may be first analyzed without analyzing the cause of the abnormality whenever the abnormality is detected. Accordingly, there is an advantage in that the unnecessary consumption of computing resources can be prevented by first analyzing an interval in which the cause of abnormality is expected to be most analyzed and derived and also selectively analyzing an interval without analyzing all the intervals.

In the case of the aforementioned embodiment, it has been described that the first analysis unit 130 detects whether abnormality is present in a target space or region and generates the inference result data of the cause of the abnormality. However, in an embodiment of the present disclosure, like the first analysis unit, the second analysis unit 140 may detect whether abnormality is present in a target space or region and generate the inference result data of the cause of the abnormality.

As an embodiment, the second analysis unit 140 may detect whether abnormality is present in a target space or region based on second data based on video and audio that have been sensed by the second sensor unit 120, and may generate the results of the detection as second analysis data.

Furthermore, when detecting whether abnormality is present in the target space or region, the second analysis unit 140 may receive an identifier corresponding to the first data for a specific period by requesting the identifier from the first analysis unit 130, and may generate the inference result data of the cause of the abnormality by reading the first data stored in the storage 150, based on the identifier.

Thereafter, the second analysis unit 140 may generate a control signal for driving the actuator 200 installed in the target space or region, based on the second data and the inference result data.

The second analysis unit 140 may package the second data in a predetermined time unit, and may store the packaged data in the storage 150 based on the identifier.

Hereinafter, an operating method that is performed by the system 100 based on the IoMT according to an embodiment of the present disclosure is described with reference to FIG. 6.

Figure 6:
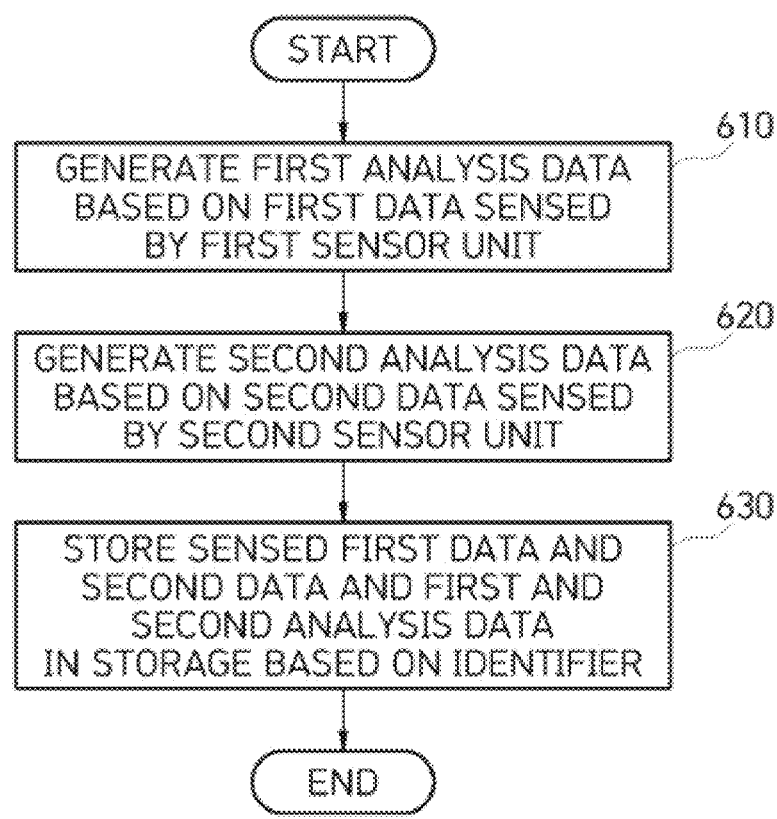
FIG. 6 is a flowchart of an operating method according to an embodiment of the present disclosure.

FIG. 6 is a flowchart of an operating method according to an embodiment of the present disclosure.

First, first analysis data for a set mission within a target space or region are generated based on first data sensed by the first sensor unit 110 (610).

Next, second analysis data for a set mission within the target space or region are generated based on second data sensed by the second sensor unit 120 (620).

Next, the sensed first data and second data and the first and second analysis data are stored in the storage 150 based on an identifier (630).

In this case, the first sensor unit 110 includes at least one sensor that performs a predetermined function in the target space or region. The second sensor unit 120 includes a sensor based on at least one of video and audio.

In the above description, steps 610 to 630 may be further divided into additional steps or may be combined into smaller steps depending on an implementation example of the present disclosure. Furthermore, some of steps 610 to 630 may be omitted, if necessary, and the sequence of steps 610 to 630 may be changed. Furthermore, although contents are omitted, the contents described with reference to FIGS. 1 to 5 may also be applied to the contents described with reference to FIG. 6.

Figure 7:
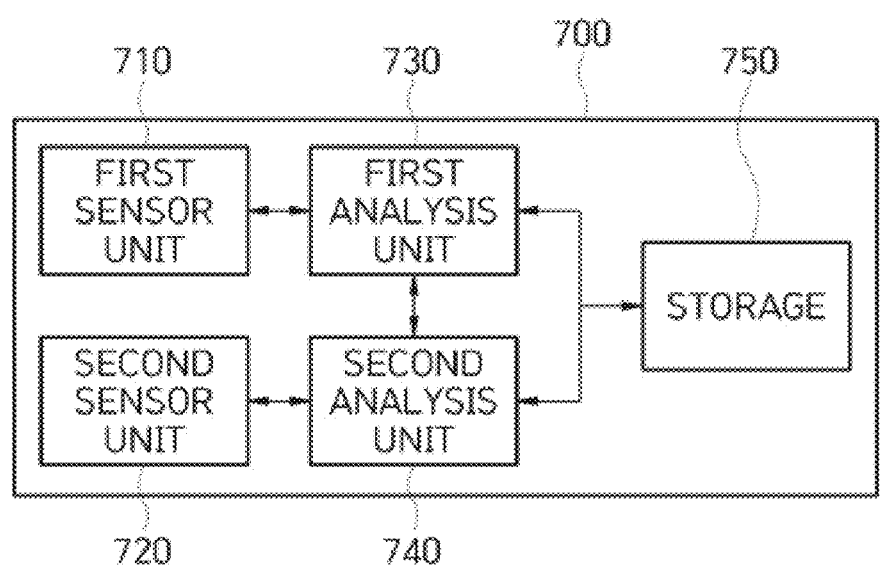
FIG. 7 is a block diagram of a system for managing a smart farm according to an embodiment of the present disclosure.

FIG. 7 is a block diagram of a system 700 for managing a smart farm according to an embodiment of the present disclosure.

The system 700 for managing a smart farm according to an embodiment of the present disclosure includes a first sensor unit 710, a second sensor unit 720, a first analysis unit 730, a second analysis unit 740, and storage 750.

The first sensor unit 710 includes at least one sensor that performs a predetermined function in a smart farm space. For example, the first sensor unit 710 may include a temperature sensor, a humidity sensor, an illuminance sensor, and an air quality measurement sensor.

The second sensor unit 720 includes at least one camera that obtains image data obtained by photographing a smart farm space. In this case, in an embodiment of the present disclosure, the type of camera is not particularly limited.

The first analysis unit 730 analyzes the inference result data of the cause of abnormality of crops within a smart farm space based on the sensing data of the first sensor unit 710.

The second analysis unit 740 monitors an abnormal state of crops within a smart farm space based on image data obtained by the second sensor unit 720.

The storage 750 stores and manages the sensing data of the first sensor unit 710 and the image data of the second sensor unit 720 based on a file identifier.

In the system 700 for managing a smart farm having such a structure, when an abnormal state of crops within a smart farm space is detected based on image data through the second analysis unit 740, the first analysis unit 730 receives a file identifier corresponding to the image data for a specific period by requesting the file identifier from the second analysis unit 740. Furthermore, the first analysis unit 730 may read image data stored in the storage 750 based on the file identifier, and may generate the inference result data of the cause of abnormality based on at least one of sensing data and the image data in the specific period.

Figure 8:
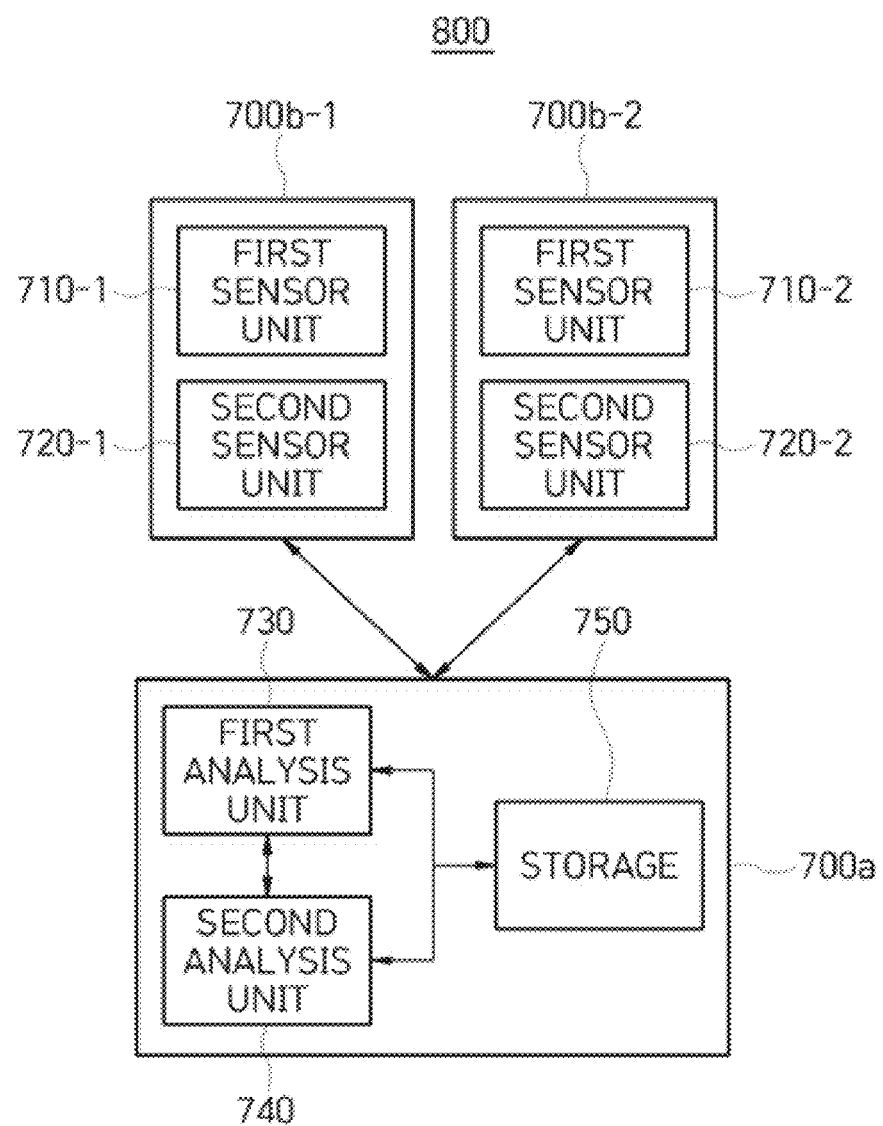
FIG. 8 is a diagram for describing a system for managing a smart farm based on a cloud according to an embodiment of the present disclosure.

FIG. 8 is a diagram for describing a system 800 (700*a* and 700*b*) for managing a smart farm based on a cloud according to an embodiment of the present disclosure.

In an embodiment of the present disclosure, the system 800 (700*a* and 700*b*) for managing a smart farm may operate based on a cloud server-edge device. In this case, an edge device 700*b* corresponding to a cloud server 700*a* may be provided in each smart farm space.

As an embodiment, the cloud server 700*a* includes first and second analysis units 730 and 740 and storage 750. Edge devices 700*b*-1, 700*b*-2, . . . may include first and second sensor units 710-1, 710-2, 720-1, 720-2, . . . , which are provided in each smart farm space.

Accordingly, the storage 750 stores and manages sensing data and image data that are received through the first and second sensor units 710-1, 710-2, 720-1, 720-2, . . . from the plurality of smart farm spaces based on file identifiers.

Furthermore, the second analysis unit 740 may monitor an abnormal state of crops within each smart farm space based on the image data. When detecting the abnormal state of the crops, the first analysis unit 730 may analyze and generate the inference result data of the cause of the abnormality of the crops within the smart farm space based on at least one of sensing data and image data.

In this case, in an embodiment of the present disclosure, the second analysis unit 730 may monitor an abnormal state of crops within each smart farm space based on at least one of a first ideal value based on a smart farm space that is included in the same area, among a plurality of smart farm spaces, or a second ideal value based on a smart farm space that is included in a different area, among the plurality of smart farm spaces.

Furthermore, in an embodiment of the present disclosure, the first analysis unit 730 may analyze and generate the inference result data of the cause of abnormality of crops within each smart farm space based on at least one of the first ideal value and the second ideal value.

As an embodiment, the first and second ideal values may be generated based on at least one of sensing data obtained by each of the first sensor units 710-1, 710-2, . . . and image data obtained by each of the second sensor units 720-1, 720-2, . . . .

As an embodiment, in a criterion for distinguishing between the first and second ideal values, the same area may be set on the basis of an administrative section or may be set on the basis of a radius around a specific location. Accordingly, the first ideal value may be identically applied to a smart farm space within the same area. If sensing data and image data in a different smart farm space are applied, the second ideal value not the first ideal value may be applied in order to monitor an abnormal state of crops within a corresponding smart farm space or analyze the inference result data of the cause of abnormality of the crops.

That is, in an embodiment of the present disclosure, each smart farm may be monitored and the inference result data of the cause of abnormality of crops may be analyzed by applying the weights of the first and second ideal values depending on whether a smart farm space is present in the same area or a different area.

Hereinafter, a detailed method and embodiment that are performed by the system 700 for managing a smart farm according to an embodiment of the present disclosure are described with reference to FIGS. 9, 10A, 10B, 11A, 11B, 12, 13A, 13B, 14A, and 14B. In an embodiment of the present disclosure, it has been described that crops are strawberry crops, but the present disclosure is not essentially limited thereto.

Figure 9:
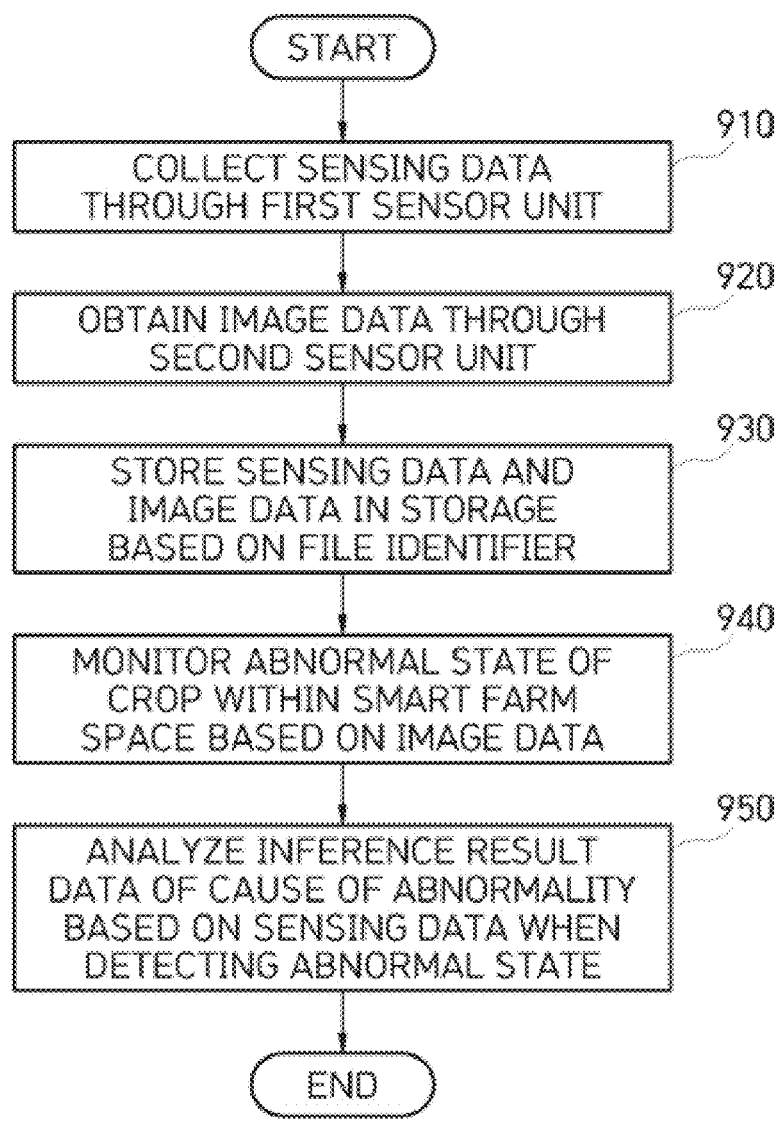
FIG. 9 is a flowchart of a method of managing a smart farm based on an IoMT according to an embodiment of the present disclosure.

FIG. 9 is a flowchart of a method of managing a smart farm based on an IoMT according to an embodiment of the present disclosure.

The method of managing a smart farm according to an embodiment of the present disclosure includes step 910 of first collecting sensing data through the first sensor unit that performs a predetermined function in a smart farm space, step 920 of obtaining image data obtained by photographing the smart farm space through the second sensor unit based on a camera, step 930 of storing the sensing data and the image data in the storage based on a file identifier, step 940 of monitoring an abnormal state of a crop within the smart farm space based on the image captured by the second sensor unit, and step 950 of analyzing the inference result data of the cause of abnormality of the crop within the smart farm space based on the sensing data of the first sensor unit when detecting the abnormal state.

FIGS. 10A and 10B are diagrams for describing a method of managing a smart farm according to a first embodiment of the present disclosure.

The first embodiment of the method of managing a smart farm is a case in which an abnormal state of a corresponding crop is monitored when the ripening of a fruit becomes slow.

Specifically, the second sensor unit obtains individual fruit images of all crops within a smart farm space as image data (1011). According to an embodiment, the second sensor unit may obtain all of the image data including all of the crops through one camera, and may divide all of the image data into a plurality of fruit image data. Alternatively, the second sensor unit may generate individual fruit images by collecting and dividing images captured by a plurality of cameras installed in respective sections within a smart farm space.

Next, the second analysis unit calculates a maximum value and minimum value of the ripening of the fruits within the smart farm space (1015) by inputting the fruit images of all of the crops to a pre-trained artificial intelligence (AI) algorithm (1013). For example, the second analysis unit may calculate a color value in each fruit image through the AI algorithm, and may calculate a maximum value and minimum value of the color values (ripening) from a distribution of the color values in the plurality of fruit images. In this case, the color value of one fruit image may be determined as an average value or a majority color value, among the multiple color values obtained from the individual fruit images.

Next, the second analysis unit may classify the fruit images for each ripening grade that is set based on the maximum value and the minimum value (1017), and may determine that the ripening of a corresponding crop is abnormal when an image of an individual fruit having a predetermined ripening grade or less is present (1019).

In this case, the ripening grade may include a plurality of interval grades on the basis of the calculated maximum value and minimum value. For example, a maximum-minimum interval may be divided into a plurality of predetermined grades based on a difference between the maximum value and minimum value of the color values of all of the obtained individual fruit images or may be divided into a plurality of grades by further considering a distribution degree of the color values. The predetermined ripening grade may be updated as the AI algorithm is trained.

Furthermore, whether a crop has the predetermined ripening grade or less may be determined based on an absolute criterion or a relative criterion.

In this case, the absolute criterion is for determining each fruit image having a specific color value or less, which is set by a manager, as an abnormal crop.

Furthermore, the relative criterion means that color values of individual fruit images are set through a mutual comparison result. That is, a grade interval may be determined based on a relative comparison between the color values of individual fruit images within a smart farm space. Accordingly, a ripening grade in a specific smart farm space may be determined differently from a ripening grade in another smart farm space.

Next, when the second analysis unit determines that the ripening of a corresponding crop is abnormal, the first analysis unit may receive a file identifier corresponding to each fruit image for a predetermined period by requesting the file identifier from the second analysis unit (1023), and may generate the inference result data of the cause of the abnormality of the ripening of the corresponding crop (1027) by reading at least one of the fruit image and sensing data stored in the storage based on the file identifier (1025).

As an embodiment, the first analysis unit may generate inference result data by checking an average temperature, a night temperature, and solar radiation data for a predetermined period (e.g., about two weeks), which correspond to a corresponding crop, and may drive the actuator based on the inference result data.

In this case, the predetermined period may be set on the basis of the time when an abnormal state is detected by the second analysis unit or may be set on the basis of specific event timing at which a corresponding crop is detected. For example, the first analysis unit may check sensing data for two weeks from the time when a strawberry flower blossoms.

Alternatively, the predetermined period may be automatically set by analyzing each fruit image having a maximum value, minimum value, or average value of the ripening of the crop in a time-serial manner. For example, the predetermined period may be automatically set based on the ratio of an interval in which an average value is present between a maximum value and a minimum value and the results of matching with a known ripening period.

Alternatively, the predetermined period may be set by a manager.

The first analysis unit may drive the actuator based on such inference result data. In this case, the first analysis unit may simultaneously all of a plurality of actuators or may selectively drive the actuator corresponding to each crop cultivation region.

For example, when an average temperature for a predetermined period, which is currently measured in a smart farm space, is lower than an expected average temperature, a heating setting temperature may be raised by 1 to 2 degrees. Alternatively, when a night temperature is lower than an expected setting night temperature, a heating setting temperature may be raised by 1 to 2 degrees. Alternatively, when accumulated solar irradiance is lower than expected accumulated solar irradiance, the amount of sunlight that enters fruits may be increased by accumulating the leaves of crops.

In an embodiment of the present disclosure, learning data for the AI algorithm may include at least one of first learning data, that is, each pre-prepared fruit image data, and second learning data, that is, each fruit image captured by the second sensor unit. Accordingly, at least one of the first and second learning data may be set as the learning data at an input stage of the AI algorithm. An output stage of the AI algorithm may be set to output a maximum value and minimum value of color values, ripening grades corresponding to the maximum value and the minimum value, and individual image data having a predetermined ripening grade or less or crop information corresponding to the individual image data having the predetermined ripening grade or less.

Figure 11A:
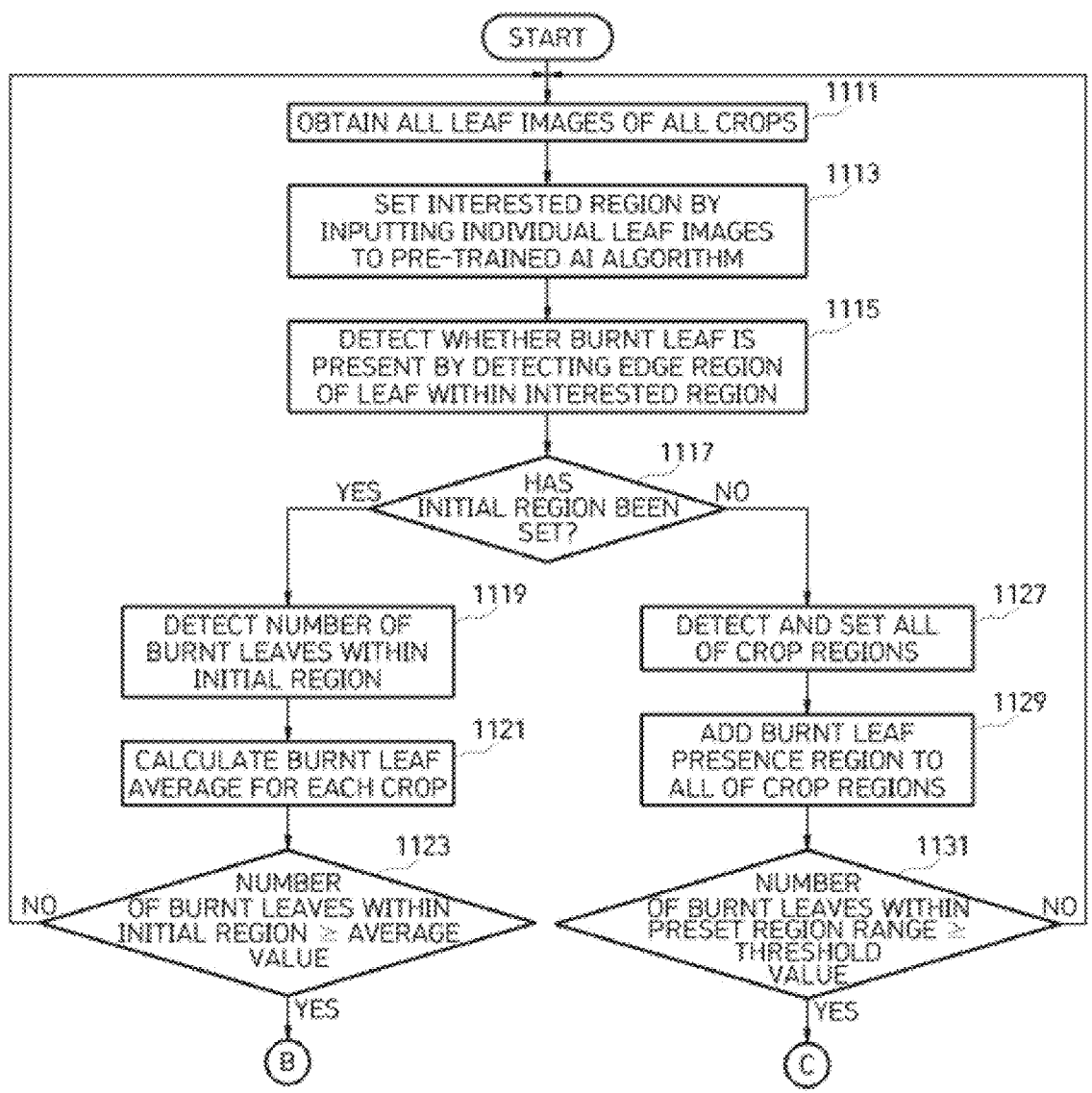
FIGS. 11A and 11B are diagrams for describing a method of managing a smart farm according to a second embodiment of the present disclosure.
Figure 11B:
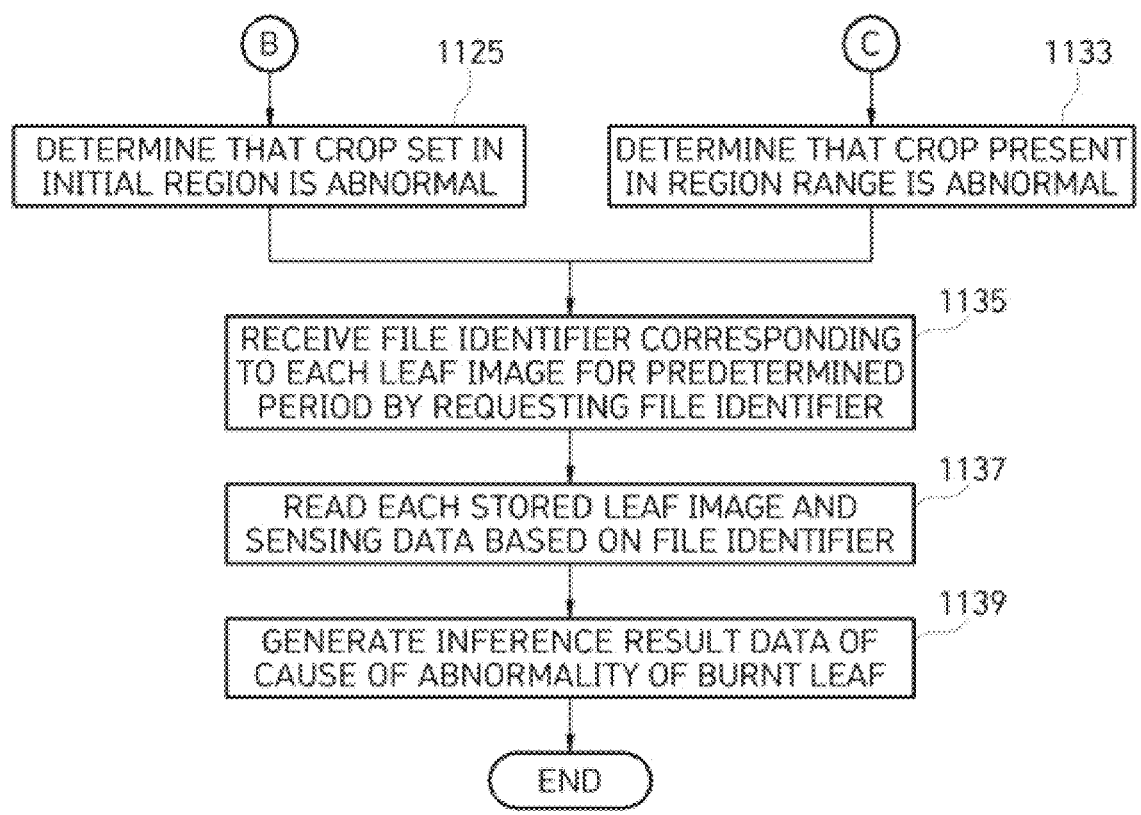
Figure 12:
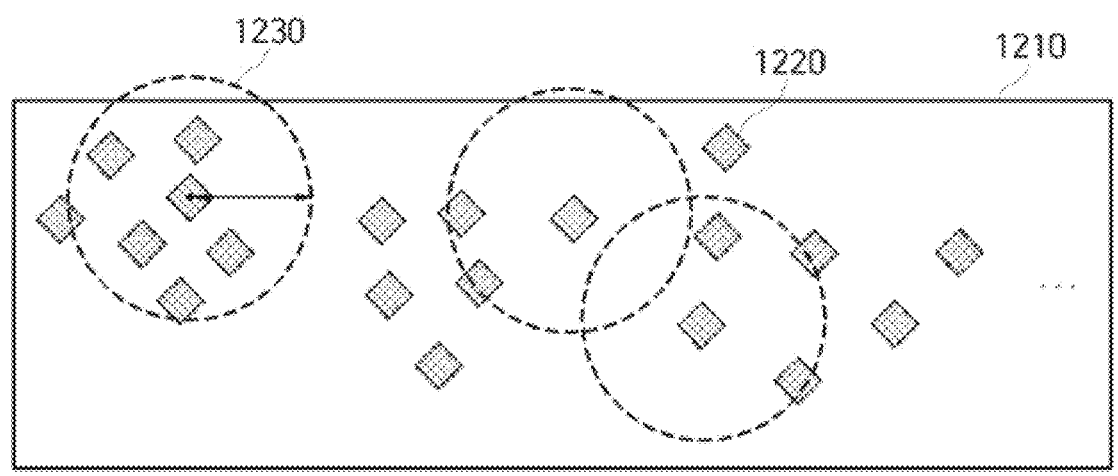
FIG. 12 is a diagram for describing contents in which whether a crop is abnormal is determined based on a burnt leaf presence region.

FIGS. 11A and 11B are diagrams for describing a method of managing a smart farm according to a second embodiment of the present disclosure. FIG. 12 is a diagram for describing contents in which whether a crop is abnormal is determined based on a burnt leaf presence region.

The second embodiment of the method of managing a smart farm is a case in which an abnormal state of a crop is monitored when a burnt leaf is present in the leaves of the crop. The burnt leaf occurs due to the shortage of calcium ions. Calcium corresponds to an ion that is least moved within the body of a crop. Accordingly, when a burnt leaf occurs, this may be interpreted as physiological stress occurring when the amount of water absorption into the body of a crop is insufficient or the growth of leaves is insufficient.

Specifically, the second sensor unit obtains individual leaf images of all crops within a smart farm space (1111) as image data. According to an embodiment, the second sensor unit may obtain all the image data of all crops through one camera, and may divide all of the image data into a plurality of individual leaf image data. Alternatively, the second sensor unit may generate individual leaf images by collecting and dividing images captured by a plurality of cameras installed in respective regions within a smart farm space.

Next, the second analysis unit sets an interested region for the individual leaf image based on a pre-trained AI algorithm (1113). Furthermore, the second analysis unit may detect whether a burnt leaf is present in each crop or all of the crops by detecting an edge region of a leaf within the interested region (1115).

As an embodiment, if an initial region corresponding to each crop has been set (317-Y), the second analysis unit calculates the number of burnt leaves detected within the initial region (1119). Furthermore, the second analysis unit may calculate a burnt leaf average value of each crop (1121) based on the number of burnt leaves detected with respect to each of all of the crops, and may determine that a crop set in the initial region is abnormal (1125) when the number of burnt leaves within the initial region is equal to or greater than the burnt leaf average value for each crop (1123-Y).

As an embodiment, when 10 crops are present within a smart farm space, 10 initial regions may be set. The number of burnt leaves detected within each initial region is calculated. If a burnt leaf average value for each crop is calculated as 5 based on the number of burnt leaves with respect to all of the 10 crops and the number of burnt leaves within any one initial region is detected as 10 greater than 5, it may be determined that a corresponding crop is abnormal.

As another example, if an initial region has not been set for each crop (1117-N), the second analysis unit detects and sets all of crop regions based on the image data obtained by the second sensor unit (1127). Furthermore, the second analysis unit adds a burnt leaf presence region that is detected based on each leaf image within all of the crop regions (1129). When the number of burnt leaves within a preset region range is equal to or greater than a preset threshold value on the basis of each leaf image having a burnt leaf (1131-Y), the second analysis unit may determine that a crop that is present in the corresponding region range is abnormal (1133).

For example, referring to FIG. 12, the second analysis unit obtains the entire strawberry seedling region 1210 from an image, extracts a burnt leaf presence region 1220 from each leaf image, and adds the burnt leaf presence region to the entire strawberry seedling region. Thereafter, the second analysis unit may calculate the number of burnt leaf presence regions within a radius of 0.5 meter 1230 on the basis of each burnt leaf presence region 1220, and may determine that a crop present in a corresponding region range is abnormal when the number of burnt leaf presence regions calculated is a threshold value or more.

In this case, FIG. 12 illustrates a radius range A3 with respect to a part of the burnt leaf presence region 1220 for convenience sake. According to an embodiment, the second analysis unit may count the number of burnt leaf presence regions within a preset region range with respect to each of all of the burnt leaf presence regions or may select a burnt leaf presence region randomly or at a predetermined interval, and may count the number of burnt leaf presence regions within the preset region range with respect to the selected burnt leaf presence region. In the latter case, if the selected preset region range includes all crop regions, the second analysis unit may stop selecting an additional burnt leaf presence region.

Next, when the second analysis unit determines that a crop is abnormal due to a burnt leaf, the first analysis unit may receive a file identifier corresponding to each leaf image for a predetermined period by requesting the file identifier from the second analysis unit (1135), and may generate the inference result data of the cause of the abnormality of the burnt leaf (1139) by reading at least one of each leaf image and sensing data stored in the storage based on the file identifier (1137).

The first analysis unit may drive the actuator based on such inference result data. In this case, the first analysis unit may simultaneously all of the plurality of actuators or may selectively drive an actuator corresponding to each crop cultivation region.

For example, crop overhead flooding (e.g., the amount of liquid supplied and the amount of liquid drained) within a smart farm space may be controlled (e.g., a pattern in which water is supplied), the composition of a culture solution may be checked, and a temperature and air humidity within a greenhouse may be checked. Furthermore, the actuator may be driven in order to facilitate the increase production of crops, increase a concentration of calcium ions in a culture solution, or additionally distribute a calcium agent.

In an embodiment of the present disclosure, learning data for the AI algorithm may include at least one of first learning data, that is, each pre-prepared leaf image data, and second learning data, that is, each leaf image captured by the second sensor unit. Accordingly, at least one of the first and second learning data may be set as the learning data at the input stage of the AI algorithm. The output stage of the AI algorithm may be set to output crop abnormality information based on the number of burnt leaves of all crops and the number of burnt leaves of each crop as a result of detection of the burnt leaves.

Figure 13A:
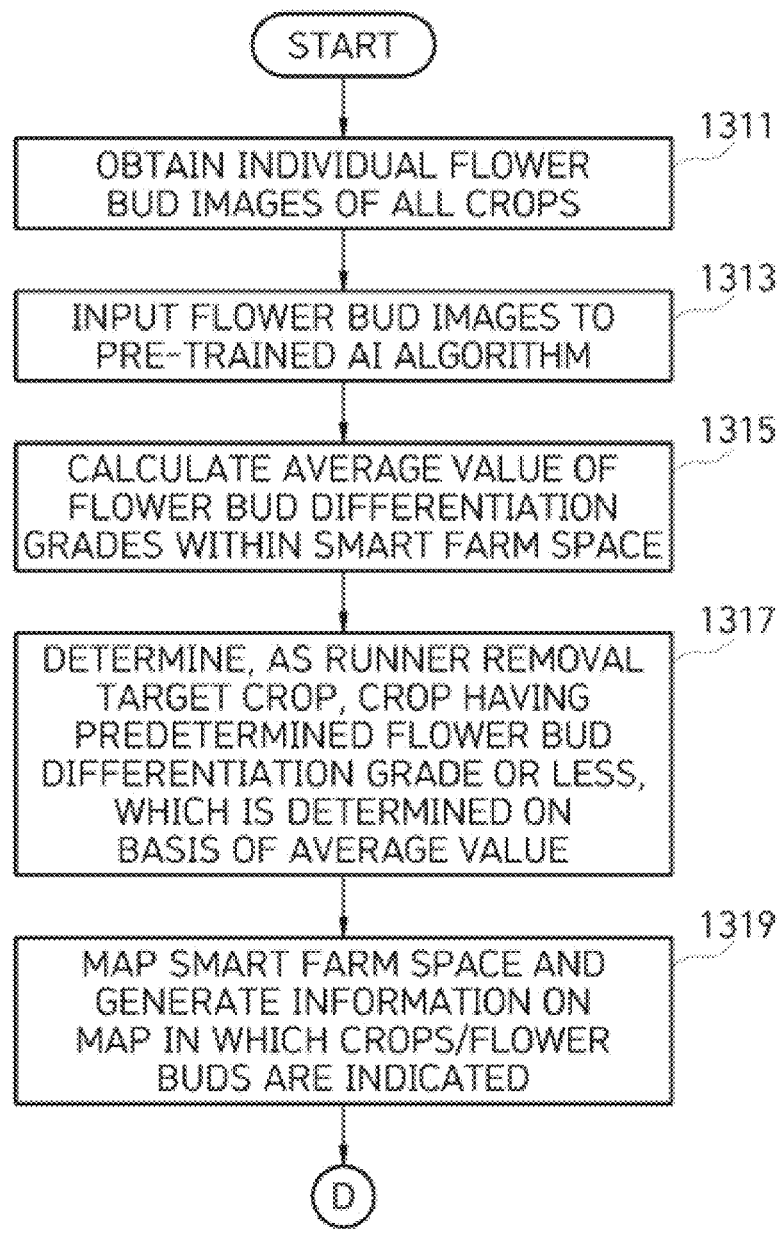
FIGS. 13A and 13B are diagrams for describing a method of managing a smart farm according to a third embodiment of the present disclosure.
Figure 13B:
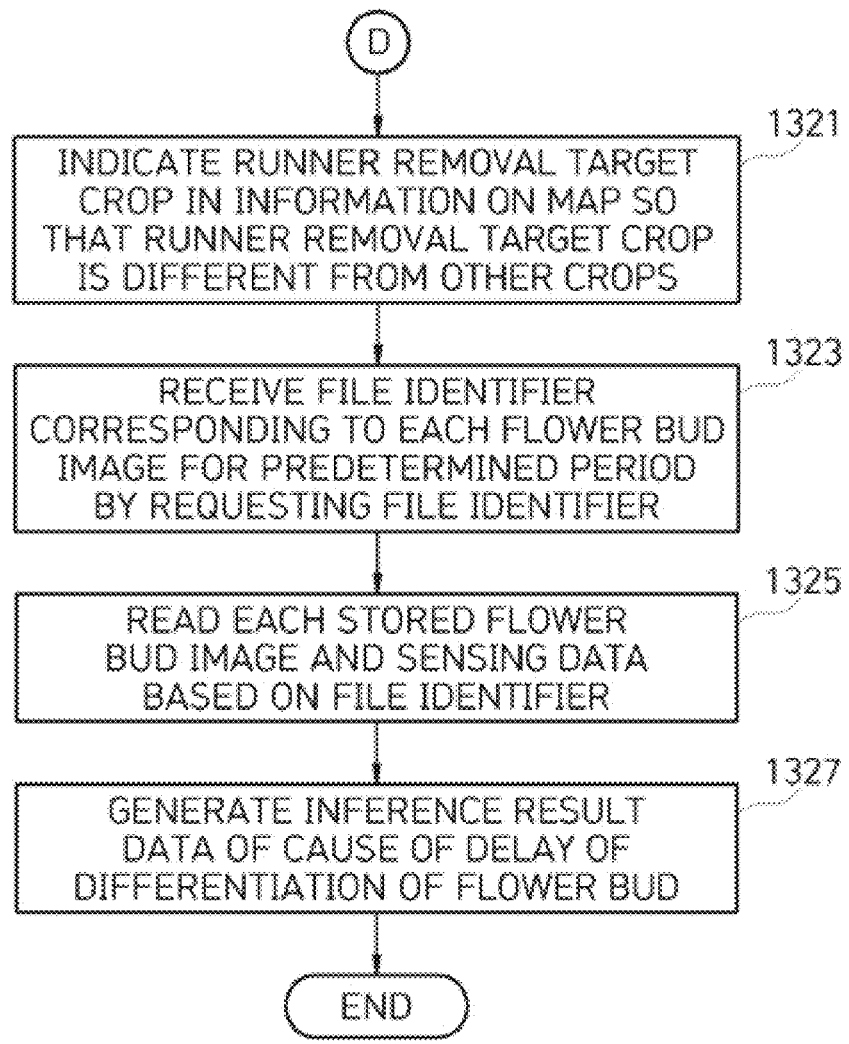

FIGS. 13A and 13B are diagrams for describing a method of managing a smart farm according to a third embodiment of the present disclosure.

The third embodiment of the method of managing a smart farm is a case in which an abnormal state of a crop is monitored when the differentiation of the flower bud of the crop is delayed. This case means that a fruit or flower is not generated after a seedling is planted because the differentiation of a flower bud is delayed due to a high temperature for a raising seedling period.

Specifically, the second sensor unit obtains individual flower bud images of all crops within a smart farm space as image data (1311). According to an embodiment, the second sensor unit may obtain all image data of all crops through one camera and then divide all of the image data into a plurality of flower bud image data. Alternatively, the second sensor unit may generate each flower bud image by collecting and dividing images obtained by a plurality of cameras installed in respective sections within the smart farm space.

Next, the second analysis unit calculates an average value of flower bud differentiation grades within the smart farm space (1315) by inputting the flower bud images of all of the crops to a pre-trained AI algorithm (1313). For example, the second analysis unit may obtain information on whether a flower bud is present based on each flower bud image and information on each flower bud, including the size (e.g., length, width, and area) of the flower bud, by using the AI algorithm, and may calculate each flower bud value that is digitized based on any one of detailed values of flower bud information or a combination of a plurality of the detailed values. When calculating each flower bud value, the second analysis unit may calculate an average value of flower bud differentiation grades within the smart farm space based on the flower bud values.

Next, the second analysis unit may determine, as a runner removal target crop, a crop having a predetermined flower bud differentiation grade or less, which is determined on the basis of the average value (1317). As the simplest example, information on whether a flower bud is present may be represented as 0 or 1. If an average value of all of 10 crops is calculated as 4, crops each having a flower bud differentiation grade less than the average value may be determined as runner removal target crops. A grade based on information on whether a flower bud is present may be divided into two grades. As another example, a grade based on information on the area of a flower bud may be divided into two or more grades.

The second analysis unit may generate information on a map in which crops and flower buds corresponding to the crops are indicated (1319) by mapping the smart farm space based on the image data and flower bud images of all of the crops. When such information on the map is generated, the second analysis unit may indicate the runner removal target crop in the information on the map so that the runner removal target crop is different from other crops (1321).

Furthermore, the second analysis unit may provide each crop region as map information by displaying the crop region in color for each grade based on a flower bud differentiation grade according to each flower bud value.

Next, when the second analysis unit determines that a runner removal target crop is present, the first analysis unit may receive a file identifier corresponding to each flower bud image for a predetermined period by requesting the file identifier from the second analysis unit (1323), and may generate the inference result data of the cause of delay of the differentiation of the flower bud (1327) by reading at least one of the flower bud image and sensing data stored in the storage, based on the file identifier (1325).

The first analysis unit may drive the actuator based on such inference result data. In this case, the first analysis unit may simultaneously all of a plurality of actuators or may selectively drive an actuator corresponding to each crop cultivation region.

For example, when an average temperature for a predetermined period, which is currently measured in a smart farm space, is higher than an average temperature that is expected to be appropriate for the differentiation of a flower bud, the first analysis unit may control the temperature to drop, and may preferably control a night temperature to be maintained at 15 to 18 degrees.

In an embodiment of the present disclosure, learning data for the AI algorithm may include first learning data, that is, each pre-prepared flower bud image data, and second learning data, that is, each flower bud image captured by the second sensor unit. Accordingly, at least one of the first and second learning data may be set as the learning data at the input stage of the AI algorithm. The output stage of the AI algorithm may be set to output a map in which a flower bud differentiation grade and a runner removal target crop detected based on the flower bud differentiation grade are indicated.

Figure 14A:
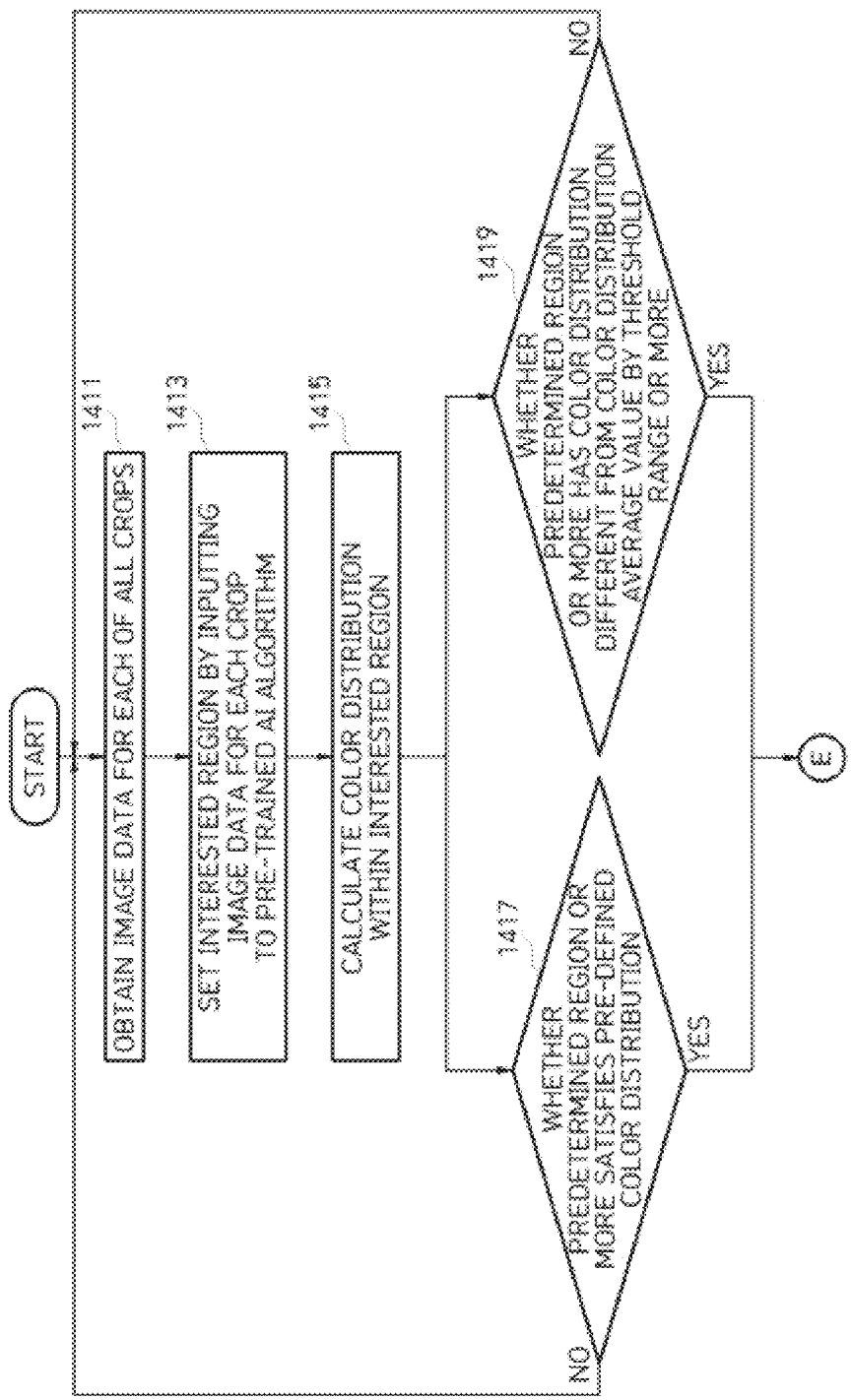
FIGS. 14A and 14B are diagrams for describing a method of managing a smart farm according to a fourth embodiment of the present disclosure.
Figure 14B:
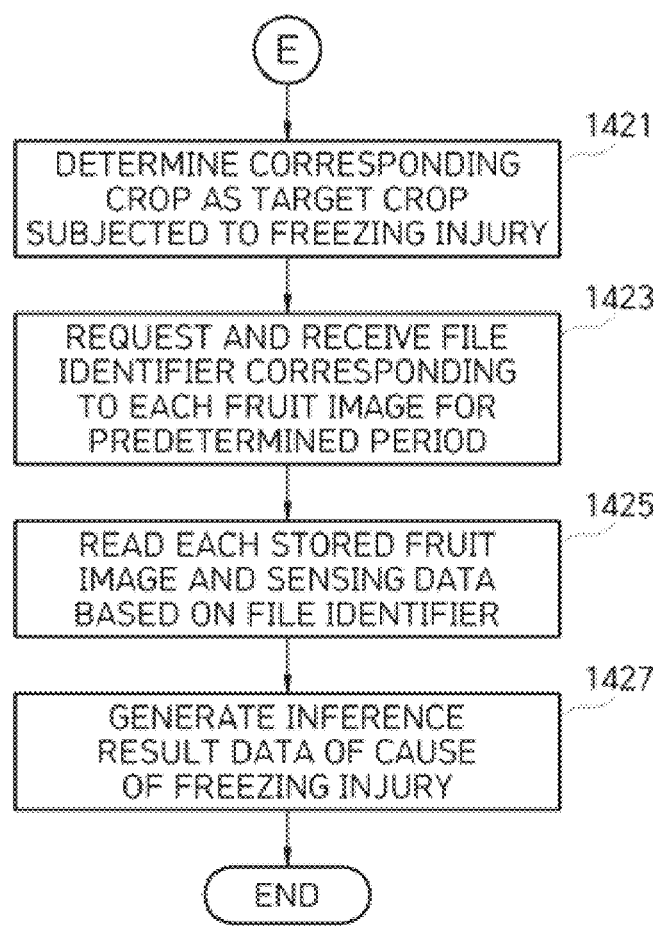

FIGS. 14A and 14B are diagrams for describing a method of managing a smart farm according to a fourth embodiment of the present disclosure.

The fourth embodiment of the method of managing a smart farm is a case in which an abnormal state of a crop is monitored based on time-series temperature data. This case is a case in which a fruit or crop is subjected to freezing injury or a malformed fruit or crop occurs when the fruit or crop is exposed to a low temperature limit temperature (5 degrees) for a long period. For example, a central part of a newly blossomed flower of a strawberry is changed in black or an ill-advised fruit occurs.

Specifically, the second sensor unit obtains image data for each of all crops within a smart farm space (1411). According to an embodiment, after capturing all of the images of crops through one camera, the second sensor unit may divide all of the images into image data by a plurality of crops. Alternatively, the second sensor unit may generate image data for each crop by collecting and dividing images obtained by a plurality of cameras installed in respective sections within the smart farm space.

Next, the second analysis unit sets a flower-central part region as an interested region based on the image data for each crop based on a pre-trained AI algorithm (1413), and calculates color distribution information within the interested region (1415). For example, the second analysis unit may calculate the color distribution information within the interested region by obtaining a color value of each pixel within the interested region through the AI algorithm.

Next, when a predetermined region or more satisfies a pre-defined color distribution (1417-Y), the second analysis unit may determine a corresponding crop as a target crop that has been subjected to freezing injury (1421). For example, if more than half a flower-central part region of a crop, which has been set as the interested region, has a black color distribution, the second analysis unit may determine the crop as a target crop that has been subjected to freezing injury (1421).

Furthermore, when determining that a predetermined region or more has a color distribution that is different from an average color distribution within the interested region for each crop, which is obtained from all of the crops by a threshold range or more (1419-Y), the second analysis unit may determine a corresponding crop as a target crop that has been subjected to freezing injury (1421).

Next, when the second analysis unit determines that a target crop that has been subjected to freezing injury is present, the first analysis unit may receive a file identifier corresponding to an image for each crop for a predetermined period by requesting the file identifier from the second analysis unit (1423), and may generate the inference result data of the cause of the freezing injury (1427) by reading at least one of the image and sensing data for each crop, which have been stored in the storage, based on the file identifier (1425).

For example, the first analysis unit may generate inference result data including timing at which freezing injury has occurred and a period in which the freezing injury has occurred by checking the data of the lowest temperature in a day for a predetermined period on the basis of timing at which a target crop subjected to freezing injury has been determined.

The first analysis unit may drive the actuator based on such inference result data. In this case, the first analysis unit may simultaneously drive all of a plurality of actuators or may selectively drive an actuator corresponding to each crop cultivation region.

For example, an auxiliary heating apparatus may be driven so that a temperature within the entire smart farm space or in a corresponding region in which a crop subjected to freezing injury is present maintains 10 degrees or higher.

In an embodiment of the present disclosure, learning data for the AI algorithm may include at least one of first learning data, that is, pre-prepared image data for each crop, and second learning data, that is, image data for each crop which have been obtained by the second sensor unit. Accordingly, at least one of the first and second learning data may be set as learning data at the input stage of the AI algorithm. The output stage of the AI algorithm may be set to output an interested region, information on a color distribution of the interested region, and the results of a determination of a target crop subjected to freezing injury.

In the aforementioned description, steps 1311 to 1427 may be further divided into additional steps or may be combined into smaller steps depending on an implementation example of the present disclosure. Furthermore, some of steps 1311 to 1427 may be omitted, if necessary, and the sequence of steps 1311 to 1427 may be changed. Furthermore, although contents are omitted, the contents described with reference to FIGS. 7 and 8 may also be applied to the contents described with reference to FIGS. 9, 10A, 10B, 11A, 11B, 12, 13A, 13B, 14A, and 14B. Furthermore, the contents described with reference to FIGS. 1 to 6 may also be applied to the contents described with reference to FIGS. 7, 8, 9, 10A, 10B, 11A, 11B, 12, 13A, 13B, 14A, and 14B.

The aforementioned embodiment of the present disclosure may be implemented in the form of a program (or application) in order to be executed by being combined with a computer, that is, hardware, and may be stored in a medium.

The aforementioned program may include a code coded in a computer language, such as C, C++, JAVA, Ruby, or a machine language which is readable by a processor (CPU) of a computer through a device interface of the computer in order for the computer to read the program and execute the methods implemented as the program. Such a code may include a functional code related to a function, etc. That defines functions necessary to execute the methods, and may include an execution procedure-related control code necessary for the processor of the computer to execute the functions according to a given procedure. Furthermore, such a code may further include a memory reference-related code indicating at which location (address number) of the memory inside or outside the computer additional information or media necessary for the processor of the computer to execute the functions needs to be referred. Furthermore, if the processor of the computer requires communication with any other remote computer or server in order to execute the functions, the code may further include a communication-related code indicating how the processor communicates with the any other remote computer or server by using a communication module of the computer and which information or media needs to be transmitted and received upon communication.

The stored medium means a medium, which semi-permanently stores data and is readable by a device, not a medium storing data for a short moment like a register, cache, or a memory. Specifically, examples of the stored medium include a ROM, a RAM, a CD-ROM, a magnetic tape, a floppy disk, optical data storage, etc., but the present disclosure is not limited thereto. That is, the program may be stored in various recording media in various servers which may be accessed by a computer or various recording media in a computer of a user. Furthermore, the medium may be distributed to computer systems connected over a network, and a code readable by a computer in a distributed way may be stored in the medium.

Although the embodiments of the present disclosure have been described with reference to the accompanying drawings, a person of ordinary knowledge in the art to which the present disclosure pertains may understand that the present disclosure may be implemented in other detailed forms without changing the technical spirit or essential characteristics of the present disclosure. Accordingly, it is to be understood that the aforementioned embodiments are only illustrative, but are not limitative in all aspects.

What is claimed is:

1. A system based on an Internet of Media Things (IoMT), comprising:
    at least one first sensor configured to sense at least one of temperature, humidity, or illuminance in a target space or region and obtain first data related to the at least one of temperature, humidity, or illuminance;
    a second sensor configured to take images of crops in the target space or region, each of the images includes at least one of leaf, fruit, or flower bud of the crops and generate second data;
    storage configured to store the first data and the second data; and
    at least one analysis processor configured to:
        package the first data and the second data by time units with identifiers for storing the first data and the second data as packaged first data and packaged second data,
        process the second data of the crops to determine abnormality of the crops within the target space or region,
        in response to determining the abnormality of the crops, process the first data to analyze cause of the abnormality of the crops, and
        control, based on the cause of the abnormality of the crops in the target space or region, at least one of supplying liquid, draining liquid, heating, or increasing sunlight illumination,
        in response to determining the abnormality, the at least one analysis processor configured to:
            identify an identifier corresponding to the second data of the crops used for determining the abnormality,
            retrieve the first data having the same identifier to analyze the cause of the abnormality,
            generate a control signal for driving one or more actuators installed in the target space or region, based on the first data and the analyzed cause of the abnormality, and
            drive the one or more actuators based on the control signal.

2. The system of claim 1, wherein: the at least one analysis processor is configured to analyze whether the abnormality is present based on the first data.

3. The system of claim 1, wherein:
    the storage is configured to store the packaged first and second data by matching the packaged first and second data so that the packaged first and second data correspond to each other in a first time unit of the time units.

4. The system of claim 1, wherein the at least one analysis processor is configured to:
    sum and calculate a time corresponding to the first data determined to be abnormal with respect to a time range set by a user,
    generate division time intervals by dividing the set time range by the summed and calculated time, and
    set a division time interval in which a number of first data detected to be abnormal in each division time interval is a minimum detection number or more as a top-priority analysis target interval for analyzing cause of the abnormality.

5. The system of claim 1, wherein the one or more actuators comprise a plurality of actuators respectively installed at a plurality of crop cultivation regions of the target space or region, and wherein the at least one analysis processor is configured to simultaneously drive all of the plurality of actuators installed the plurality of crop cultivation regions.

6. The system of claim 1, wherein the one or more actuators comprise a plurality of actuators respectively installed at a plurality of crop cultivation regions of the target space or region, and wherein the at least one analysis processor is configured to individually drive the plurality of actuators.

7. A system for managing a smart farm based on the Internet of Media Things (IoMT), the system comprising:
    at least one first sensor configured to sense at least one of temperature, humidity, or illuminance in a smart farm space obtain sensing data related to the at least one of temperature, humidity, or illuminance;
    a second sensor configured to is configured to take images of crops in smart farm, each of the images includes at least one of leaf, fruit, or flower bud of the crops and generate image data;
    storage configured to store the sensing data of the at least one first sensor and the image data of the second sensor based on a-file identifiers; and
    at least one analysis processor configured to:
        package the sensing data and the image data by time units with the file identifiers,
        process the image data of the crops to determine abnormality of the crops within the smart farm,
        in response to determining the abnormality of the crops, process the sensing data to analyze cause of the abnormality of the crops, and control, based on the cause of the abnormality of the crops in the smart farm, at least one of supplying liquid, draining liquid, heating, or increasing sunlight illumination, wherein, in response to determining the abnormality, the at least one analysis processor is configured to:
identify an identifier corresponding to the image data of the crops used for determining the abnormality,
retrieve the sensing data having the same identifier to analyze the cause of the abnormality,
generate a control signal for driving one or more actuators installed in the smart farm, based on the first data and the analyzed cause of the abnormality, and
drive the one or more actuators based on the control signal.

8. The system of claim 7, wherein:
the second sensor is configured to obtain individual fruit images of all crops within the smart farm space as the image data, and
the at least one analysis processor is configured to:
calculate a maximum value and minimum value of ripening of fruits within the smart farm by inputting fruit images of all of the crops to a pre-trained artificial intelligence algorithm,
divide the fruit images for each ripening grade set based on the maximum value and the minimum value, and
determine that the ripening of a corresponding crop is abnormal when a fruit image having a predetermined ripening grade or less based on a relative or absolute criterion is present.

9. The system of claim 7, wherein:
the second sensor is configured to obtain leaf images of all crops within the smart farm as the image data, and
the at least one analysis processor is configured to set an interested region for an individual leaf image based on a pre-trained artificial intelligence algorithm and detect whether a burnt leaf is present with respect to each crop or all of the crops by detecting an edge region of a leaf within the interested region.

10. The system of claim 9, wherein the at least one analysis processor is configured to:
calculate a number of burnt leaves detected within an initial region set with respect to each crop,
calculate a burnt leaf average value for each crop based on the number of detected burnt leaves with respect to all of the crops, and
determine that a crop set as the initial region is abnormal when the number of burnt leaves within the initial region is equal to or greater than the burnt leaf average value for each crop.

11. The system of claim 9, wherein the at least one analysis processor is configured to:
detect and set all crop regions based on the image data obtained by the second sensor,
add a region in which a burnt leaf detected based on each leaf image is present within all of the crop regions and define the region as a burnt leaf presence region, and
determine that a crop present in a corresponding region range is abnormal when the burnt leaf presence region within a preset region range based on each leaf image including the burnt leaf has a preset threshold value or more.

12. The system of claim 7, wherein:
the second sensor is configured to obtain flower bud images of all crops within the smart farm space as the image data,
the at least one analysis processor is configured to:
calculate an average value of flower bud differentiation grades within the smart farm space by inputting the flower bud images of all of the crops to a pre-trained artificial intelligence algorithm, and
determine, as a runner removal target crop, a crop having a predetermined flower bud differentiation grade or less, which is determined based on the average value.

13. The system of claim 12, wherein the at least one analysis processor is configured to:
generate information on a map in which crops and flower buds corresponding to the crops, respectively, are indicated by mapping the smart farm space based on the image data and flower bud images of all of the crops, and
display the runner removal target crop on the information on the map so that the runner removal target crop is different from other crops or provide the information on the map by displaying each crop region in color for each grade based on the flower bud differentiation grade.

14. The system of claim 7, wherein:
the second sensor is configured to obtain the image data of all the crops within the smart farm space, and
the at least one analysis processor is configured to:
set a flower-central part region as an interested region based on the image data for each crop by using a pre-trained artificial intelligence algorithm,
calculate color distribution information within the interested region, and
determine a corresponding crop as a target crop subjected to freezing injury in response to a predetermined region or more having a predefined color distribution or in response to a predetermined region or more having a color distribution equal to or greater than a color distribution average within an interested region for each crop, which is obtained from all of the crops, by a threshold range or more.

15. An operating method that is performed by a system based on an Internet of Media Things (IoMT), the operating method comprising:
sensing, by at least one first sensor, at least one of temperature, humidity, or illuminance in a target space or region to obtain first data related to the at least one of temperature, humidity, or illuminance;
taking, by a second sensor, images of crops in the target space or region, each of the images includes at least one of leaf, fruit, or flower bud of the crops to generate second data;
packaging, by at least one analysis processor, the first data and the second data by time units with identifiers;
storing the first data and the second data, and the identifiers in storage;
processing, by the at least one analysis processor, the second data of the crops to determine abnormality of the crops within the target space or region,
in response to determining the abnormality of the crops, processing, by the at least one analysis processor, the first data to analyze cause of the abnormality of the crops, and
controlling, by the at least one analysis processor, based on the cause of the abnormality of the crops in the target space or region, at least one of supplying liquid, draining liquid, heating, or increasing sunlight illumination, wherein, in response to determining the abnormality, the at least one analysis processor is configured to:
identify an identifier corresponding to the second data of the crops used for determining the abnormality,
retrieve the first data having the same identifier to analyze the cause of the abnormality,
generate a control signal for driving one or more actuators installed in the target space or region, based on the first data and the analyzed cause of the abnormality, and
drive the one or more actuators based on the control signal.

* * * * *